D. G. SAUNDERS, Jr., DEC'D.
D. G. SAUNDERS, ADMINISTRATOR.
MOUNTING FOR HEAVY GUNS.
APPLICATION FILED SEPT. 27, 1917.
1,357,479.
Patented Nov. 2, 1920.
6 SHEETS—SHEET 1.
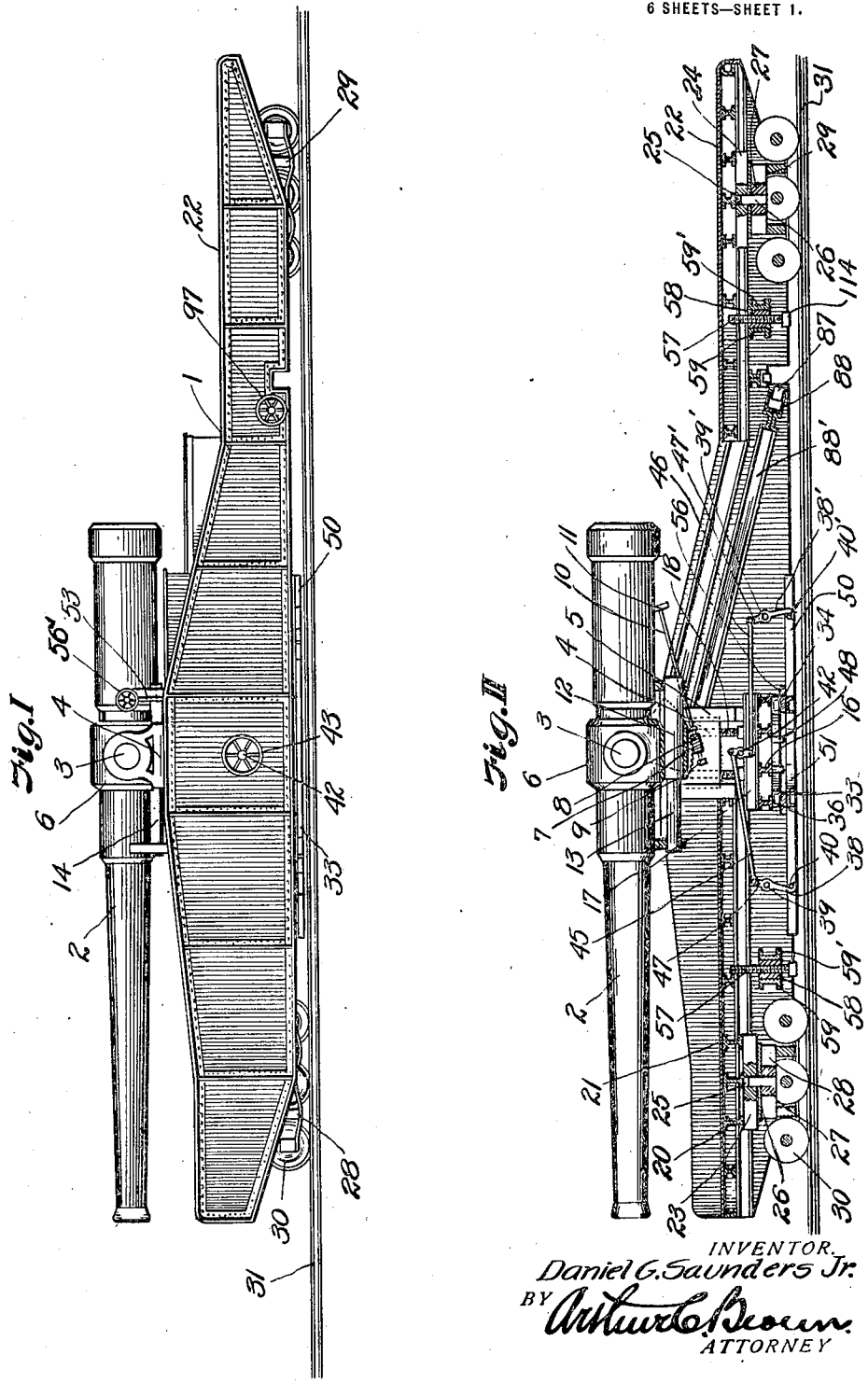
INVENTOR.
Daniel G. Saunders Jr.
BY Arthur C. Brown
ATTORNEY

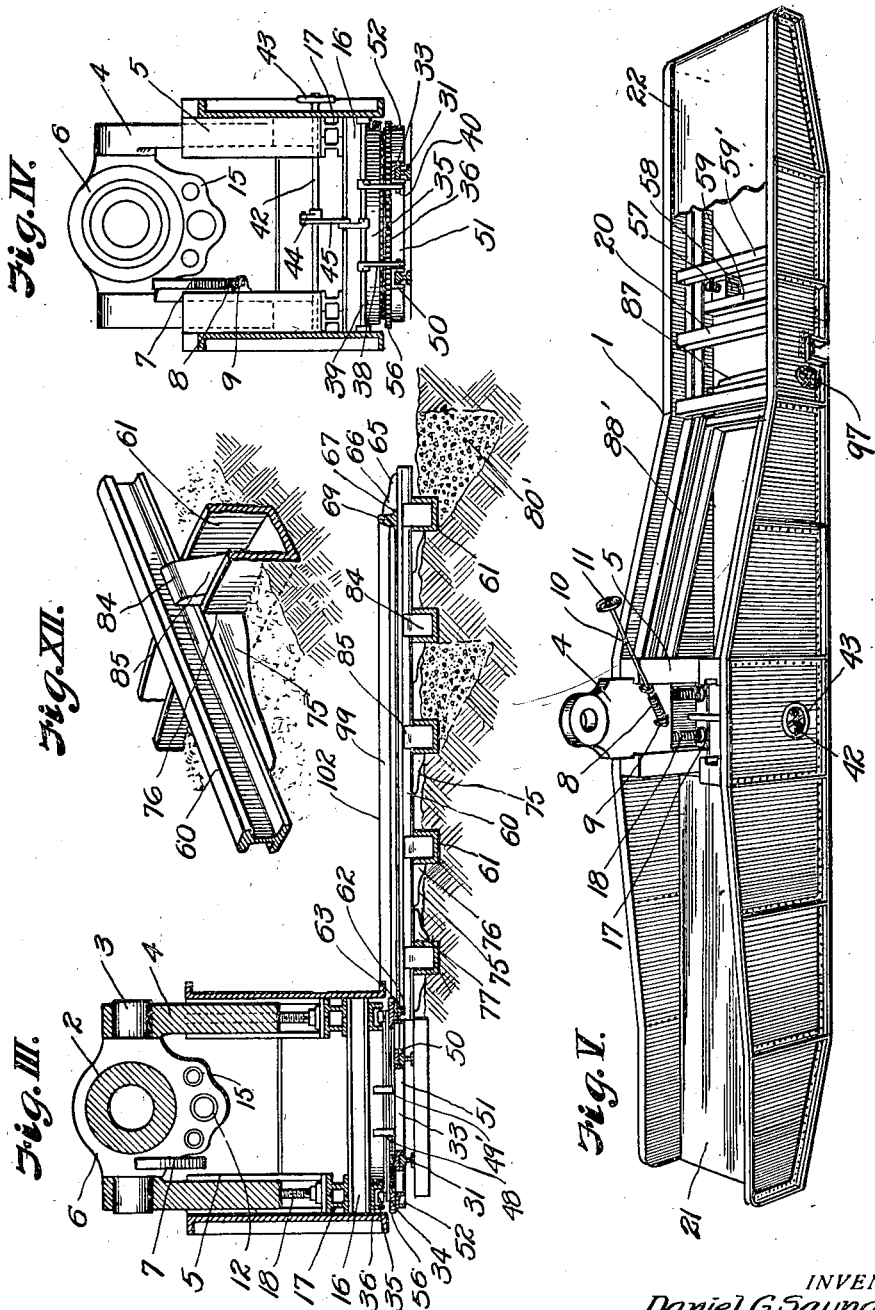

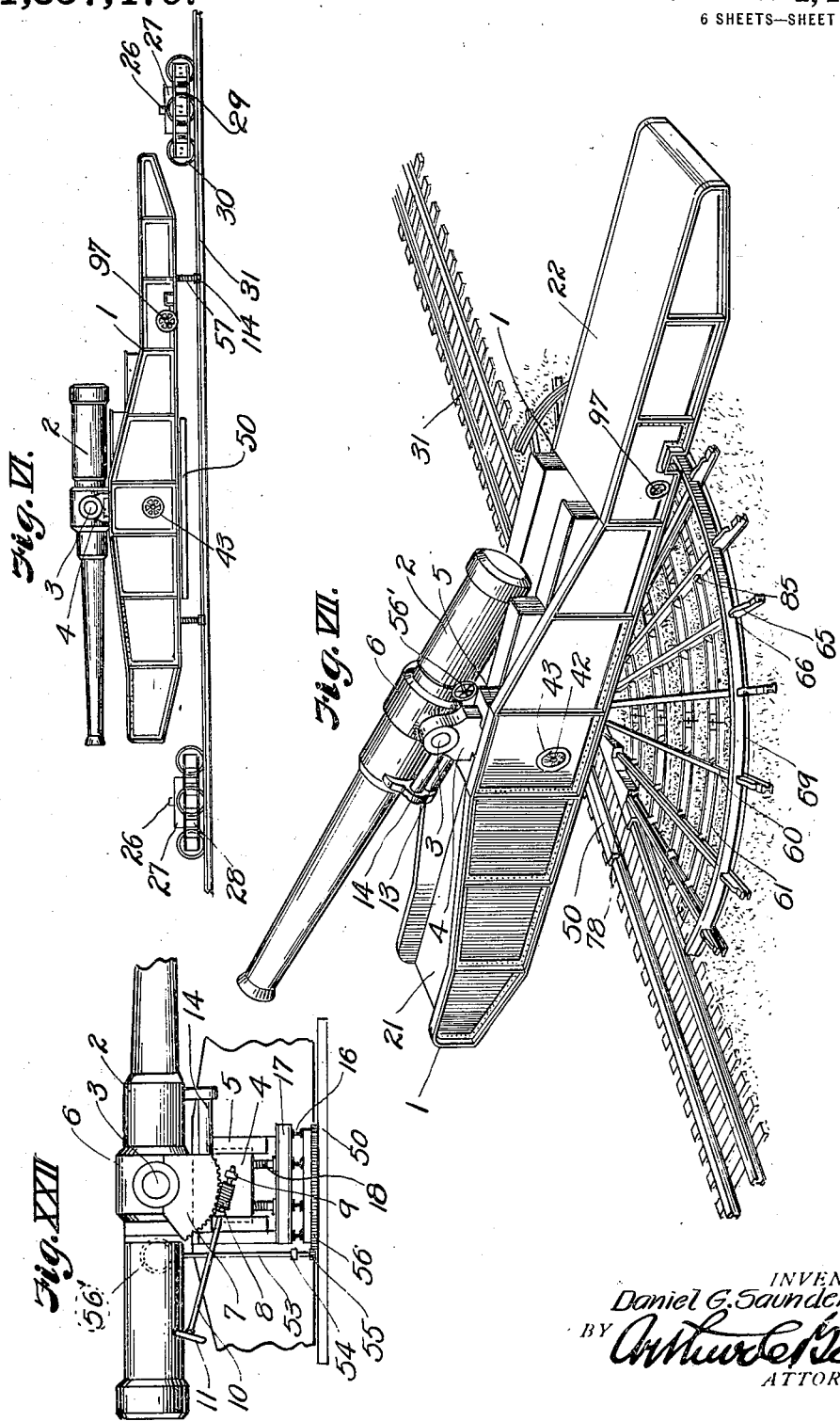

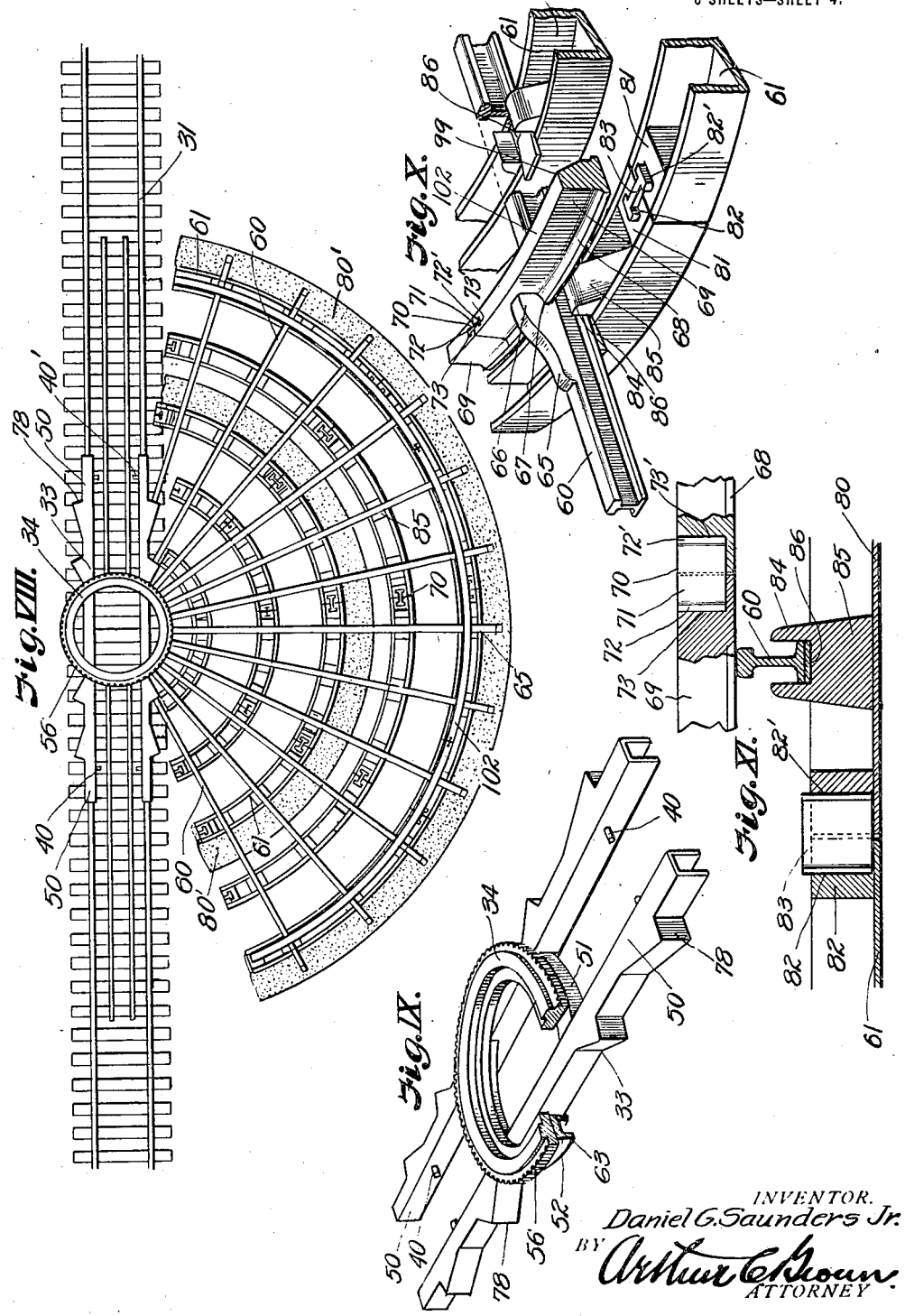

D. G. SAUNDERS, Jr., DEC'D.
D. G. SAUNDERS, ADMINISTRATOR.
MOUNTING FOR HEAVY GUNS.
APPLICATION FILED SEPT. 27, 1917.
1,357,479.
Patented Nov. 2, 1920.
6 SHEETS—SHEET 5.
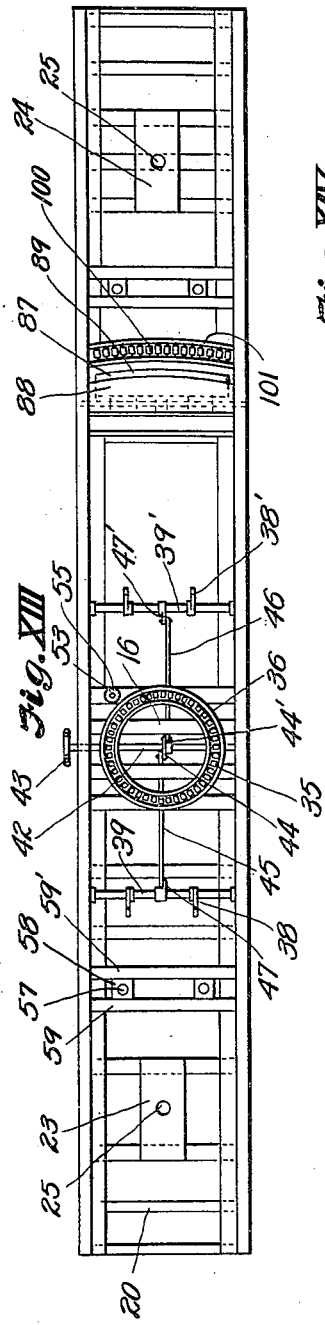
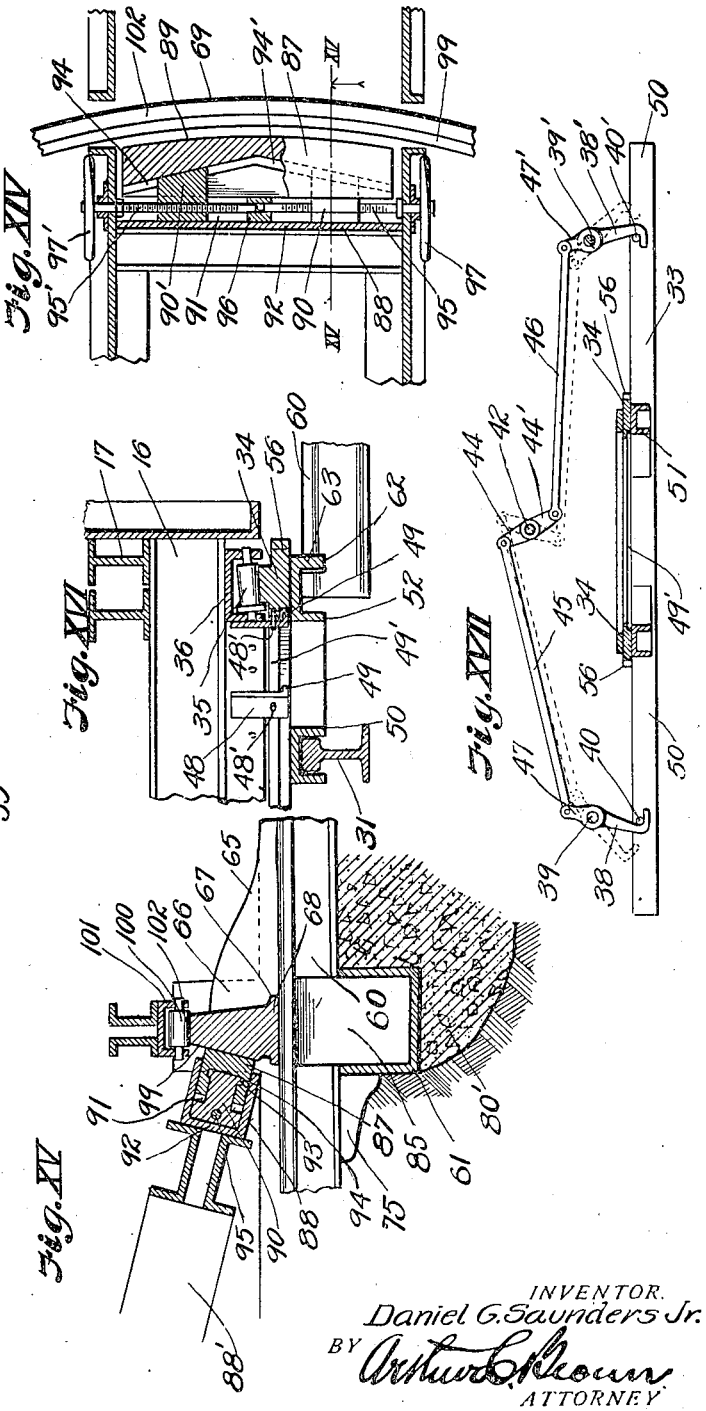
INVENTOR.
Daniel G. Saunders Jr.
BY
ATTORNEY D. G. SAUNDERS, Jr., DEC'D.
D. G. SAUNDERS, ADMINISTRATOR.
MOUNTING FOR HEAVY GUNS.
APPLICATION FILED SEPT. 27, 1917.
1,357,479.
Patented Nov. 2, 1920.
6 SHEETS—SHEET 6.
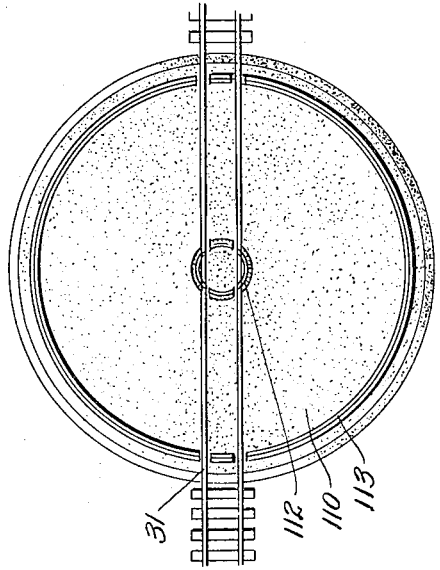
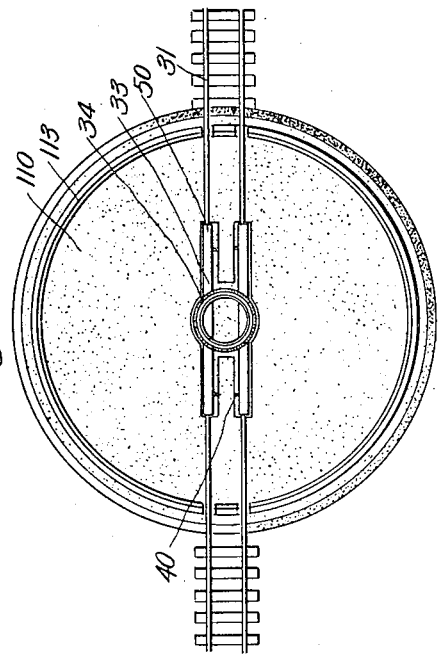
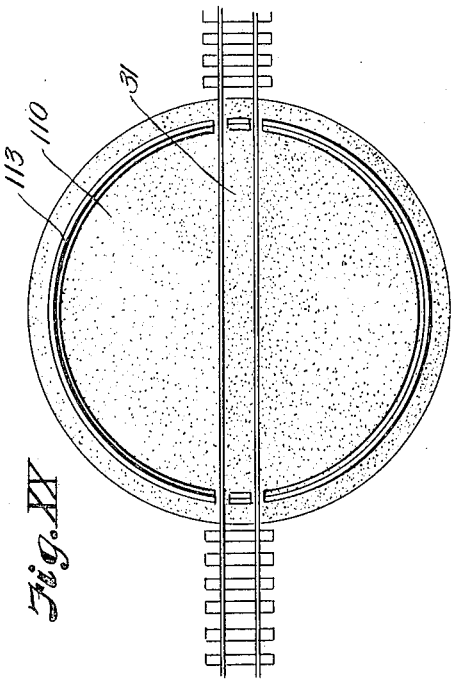
INVENTOR.
Daniel G. Saunders Jr.
BY
ATTORNEY

UNITED STATES PATENT OFFICE.

DANIEL G. SAUNDERS, JR., OF KANSAS CITY, MISSOURI; DANIEL G. SAUNDERS, ADMINISTRATOR OF SAID DANIEL G. SAUNDERS, JR., DECEASED, ASSIGNOR TO ARTHUR C. BROWN, OF KANSAS CITY, MISSOURI.

MOUNTING FOR HEAVY GUNS.

1,357,479.   Specification of Letters Patent.   Patented Nov. 2, 1920.

Application filed September 27, 1917. Serial No. 193,425.

*To all whom it may concern:*

Be it known that I, DANIEL G. SAUNDERS, Jr., a citizen of the United States, residing at Kansas City, in the county of Jackson and State of Missouri, have invented certain new and useful Improvements in Mountings for Heavy Guns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to mounting for heavy guns, and has for its principal object to provide for the transportation of guns of large caliber over a railway to a point of desired use, and the rapid and substantial placement of the gun in a manner to admit of its discharging in any direction.

The invention is particularly adapted to provide defense along an extended coast line or border, and to that end I have provided for the transportation of the gun on railway trucks and for the transfer thereof from the trucks to a ground foundation, preferably including the rails of the railway track and braces for taking the thrust of the gun to steady the same and obviate displacement or strain on the track rails.

The invention more in detail includes a platform which is supported from the gun carriage during transportation and may be lowered onto the railway track to form an extended foundation for the carriage or be removed from the carriage to admit of the placement of the carriage on a permanent foundation located in the track.

The invention also includes other details of structure hereinafter described and illustrated in the accompanying drawings, wherein:

Figure I is a side elevation of a gun having a mounting embodying my improvements, showing the gun mounted on trucks for transportation along a track and illustrating the suspension of the detachable platform.

Fig. II is a longitudinal section of the same, illustrating the platform and jack mechanism.

Fig. III is a cross section of the gun, its carriage, including the detachable platform, and brace apparatus and the platform that supports the carriage from the track rails.

Fig. IV is a cross section of the gun and carriage, particularly illustrating the platform carrying mechanism.

Fig. V is a detail perspective view of the gun carriage, particularly illustrating one of the adjustable gun supports with its guide ways and bracing members.

Fig. VI is a side elevation of the gun, showing the trucks removed and the carriage supported on its jacks prior to lowering onto the foundation.

Fig. VII is a perspective view of the gun in functional position, particularly illustrating the foundation construction.

Fig. VIII is a plan view of the gun foundation, particularly illustrating the radial arrangement of the brace rails and their foundation members.

Fig. IX is a detail perspective view of the detachable platform.

Fig. X is a detail perspective view of a portion of the foundation, particularly illustrating the connection of the foundation members and the mounting of the brace rails and arcuate track thereon.

Fig. XI is a longitudinal sectional view along a foundation member, illustrating the keying together of the sections and a rail supporting block mounted thereon.

Fig. XII is a detail perspective view of a portion of one of the brace rails, showing its abutment block.

Fig. XIII is an inverted plan view of the gun carriage.

Fig. XIV is an enlarged horizontal section of part of the carriage, particularly illustrating its brace clamps and a part of the arcuate brace rail.

Fig. XV is a vertical sectional view on the line XV—XV, Fig. XIV.

Fig. XVI is an enlarged sectional view through the pivot track section and gun carriage, illustrating the mounting of the carriage rollers.

Fig. XVII is an enlarged side view of the removable foundation supporting members.

Fig. XVIII is a plan view of a permanent foundation with the detachable platform mounted thereon.

Fig. XIX is a plan view of a similar permanent foundation whereon the pivot track section is permanently mounted.

Fig. XX illustrates a permanent foundation without the pivot section.

Fig. XXI is a plan view showing the arrangement of brace rails when the gun is to be fired in alinement with the track.

Fig. XXII is a side view of a portion of the gun, showing the mechanism by which the direction of the gun is adjusted.

Referring more in detail to the drawings:

1 designates a gun carriage of ordinary construction, except for my improvements, and 2 a gun having the usual trunnion mountings 3 revoluble in vertically adjustable bearing members 4, slidably supported between guide ways 5 mounted at opposite sides of the carriage to support the gun at heights above the body of the carriage that will allow for clearance and for the recoil when the gun is in inclined position. The barrel of the gun is slidably mounted in the collar 6 that carries the trunnions 3 and has an arcuate rack 7 operable by a worm gear 8 (Fig. XXII) mounted in bearings 9 fixed on one of the slide members 4 and having connection through a rod 10 with a hand wheel 11 whereby the collar may be moved to adjust the barrel on its horizontal axis. The gun is also provided with the ordinary recoil mechanism comprising a chamber 12 on the collar 6, a piston 13 on the barrel 2 and working in the chamber 12 and guides 14 fixed to the barrel and slidable in sleeves 15 on the collar 6.

Mounted transversely at the center of the car below the gun supporting members 4 are cross beams 16, and supported thereon longitudinally with the carriage and at the opposite sides are beams 17, whereon spaced screw jacks 18 are mounted; the latter being threaded into the slidable members 4 so that by operation of the jacks the gun may be raised or lowered vertically as required to give the necessary recoil clearance.

The carriage is also provided with cross beams 20 which add rigidity to the structure and wherein the forward and rearward floor members 21—22 are mounted, and fixed adjacent the front and rear of the carriage beneath the cross beams 20 are bearing plates 23—24, each provided with a central aperture 25 for receiving upwardly extending pins 26 fixed on the cross beams 27 of trucks 28—29 to center the gun carriage on the truck when the carriage is lowered thereto in the manner presently described, and which provide a coupling between the carriage and trucks that serves to form a traveling unit of the trucks and carriage when the parts are so assembled. The trucks have the flanged wheels 30 that adapt them for travel over the rails 31 of a railway track so that the carriage may be moved along the track rapidly and safely to any desired point within its length.

As it is the purpose of the invention to conduct heavy guns to points along an extended coast line or border, in order to provide mobile defense or offense to an extent that would be impossible were it necessary to locate an adequate number of the guns permanently along such lines, it is necessary that a gun be temporarily placed for firing after it has been conducted to the desired point. It is readily apparent that a gun of the construction requiring a carriage of the type herein described would have no lateral range on its carriage mounting, so that while it might be fired in a line with the track it would be useless for offense or defense in any direction out of such alinement, and it is to adapt the gun for such lateral adjustment that I have devised the present invention.

It is further apparent that if there is any lateral adjustment of the gun it must be an adjustment of the carriage rather than of the gun on its carriage, and that such adjustment must be secured independently of the trucks that support the carriage on the railway track.

In securing the adjustment I therefore provide for removing the trucks and supporting the carriage from the track on a foundation located in the track and for turning the carriage on such support in order to provide the adjustment desired. As the weight of the carriage and gun would not permit of ready movement of the carriage on a track or ground foundation without a roller bearing of some kind, I have provided the carriage with such bearing; the preferred embodiment thereof comprising a platform 33 (Fig. IX) embodying ground members and an annular track 34 adapted for engagement by the roller 35 arranged radially in an annular inverted channel housing 36 permanently secured to and forming part of the gun carriage; the said housing being located beneath the gun mounting members to balance the same when supported on the platform track 34. The platform 33 is made a semipermanent part of the gun carriage by a connection therewith through the latch hooks 38—38', which are extended from cross bars 39—39' revolubly mounted in the carriage at opposite sides of the channel housing and are adapted for engaging studs 4—40' on the platform 33 to suspend the platform from the carriage.

The preferred construction of the suspending mechanism comprises a transverse shaft 42 which is rotatably mounted in the side walls of the carriage and extends diametrically across the channel housing 36; one end of the shaft being provided with an operating wheel 43 whereby the shaft may be turned to actuate the latch hooks.

Fixed to the shaft about the center of the housing are oppositely extending crank arms 44—44' and pivotally connected with said arms are links 45—46, which extend in opposite directions, and are connected at their outer ends with rocker arms 47—47' on the cross bars 39—39'; the said cross bars carrying the hooks 38—38', which are adapted for taking under the studs 40 and 40' on the platform 33 to support the same while traveling.

It is apparent that by turning the shaft 42, as with the wheel 43, in one direction, the hooks may be moved apart to disconnect from the platform studs and free the platform, and that upon movement of the shaft in the opposite direction the hooks may be returned to their latch engagement with the platform studs.

The hooks 38—38' supporting the base 33 are supplemented by additional supporting members, comprising plates 48 fixed at spaced intervals about the inner face of the roller frame 36 and have outturned ears 49 extending beneath an annular flange 49' on the inner face of the track 34, so that the base may be raised from the rails and supported thereby without interfering with the pivotal mounting of the carriage. During transit, a pin 48' is inserted through registered openings in the plate 48 and flange 49' to prevent the base 33 from turning. In case the plates 48 are used to support the base 33, the hooks 38, 38' and their operating mechanism may be eliminated if desired.

The base 33, in its preferred construction and to adapt it for forming a substantial foundation for the gun and its carriage, comprises ground beams 50, which carry the annular track 34 and are adapted for support on the railway track; the preferred construction of the beams and their combination with the annular track being that wherein each comprises an inverted channel of sufficient width and depth to fit over the ball of the track rail and for support on the rail base; in this way providing an extended bearing for the platform along the track rails. With this construction the beams are connected by arcuate ribs 51 and have laterally directed channel shelves 52, forming a continuous support for the annular track 34.

To turn the carriage on the annular platform track to position the gun, I provide the carriage with a vertical shaft 53, (Fig. XXII) that is rotatable in bearings 54 on the carriage and has a pinion 55 fixed on its lower end and meshing with a rack ring 56 on the periphery of the track 34; the upper end of the shaft having a hand wheel 56' whereby the shaft may be turned in its bearings to propel the carriage about on its annular support.

As the carriage must be raised and lowered from and to trucks and to and from the ground support when the gun is being placed in operative position or returned to the trucks for further transport, I provide for vertical movement of the carriage by locating jacks at suitable points thereon. The preferred jack construction comprises screw standards 57, (Fig. II) which are threaded through blocks 58 mounted between cross beams 59—59' adjacent opposite ends of the carriage at suitable positions relative to the center of gravity and which may be operated individually to raise and lower the carriage vertically.

The jacks are preferably arranged to seat on the track rails 31 and have shoes 114 at the ends for fitting the rails to hold the standards in position thereon.

As previously stated, while a heavy gun may be discharged in alinement with the track with accuracy and without damage to the track or carriage, it is essential that the gun have adjustment laterally, and in order to adapt it for firing at such laterally variable angles it is necessary to provide the supplemental supports and braces for taking the recoil thrust.

As a preferred means for accomplishing this result, I provide radial brace rails 60, which are adapted for support on arcuate beams 61 arranged at the side of the track. Each rail 60 has a socket 62 (Fig. XVI) in its upper edge adjacent one end to fit under the depending flange 63 of a base shelf 52 to anchor the radial brace rails to the track upon which the gun is supported.

Each of the rails 60 is provided with a brace block 65 (Fig. X) which may be formed integrally with or rigidly secured to the top of the rail and comprises a head 66 at one end having a socket 67 therein for receiving the base flange 68 of an arcuate brace rail 69, to brace and retain the latter substantially in functional position.

With this arrangement a number of the brace rails may be extended radially from the platform 33 and as the rails are all anchored to the platform the brace blocks are arranged concentrically to receive the arcuate rails 69, which, when assembled, form a circular abutment for a corresponding part on the gun carriage. There may be any suitable number of sections in the abutment according to the horizontal range it is desired to give the gun, and these individual sections are preferably rigidly connected when in place by key members 70 (Fig. X—XI) comprising a web 71 having end heads 72—72' thereon which are adapted to seat in coöperating sockets 73—73' in the abutting ends of the beams so that the beam sections may be rigidly secured together but are quickly connected or disconnected.

Each of the radial rails is provided on its under face with spaced abutment blocks 75 (Figs. III and XII) having outwardly facing heads 76 adapted to engage the inner walls of the arcuate base members, presently described, to substantially brace the rails against outward thrust; some of the rails being provided with blocks 77 (Fig. III) facing oppositely to the blocks 75 to abut the outer faces of the base members, and the track rails 50 of the pivot section 33 with laterally extending shoulders 78 against which the ends of some of the radial rails may abut to prevent inward movement of the foundation parts.

The arcuate base rails may be arranged sufficiently close to provide a substantial foundation and each comprises a number of sections which may be connected in a suitable manner to insure a substantial base, the preferred construction of the base sections comprising upwardly facing channel beams, having blocks 81 fixed between their side walls at their abutting ends and are provided with registering sockets 82—82', wherein keys 83 may be inserted (Fig. X) to lock the sections together.

When in position the radial base rails rest upon the edges of the channel base members and are held in position thereon between the upstanding side flanges 84 of anchor blocks 85 fixed within the channel members. Adjusting plates 86 may be used when needed to level up the rails.

In order to fix the gun carriage in an adjusted position I provide a friction clamp head 87 (Fig. XIV) which is slidably mounted in a rearwardly opening channel member 88 fixed transversely across the carriage adjacent the arcuate brace rail 69; the channel 88 being braced by beams 88' extending rearwardly from the guide ways 5 and seated against the opposite ends of the channel carrying members. The head 87 comprises a contact body having a bearing surface 89 of the same curvature as the arcuate abutment and arranged at such an angle that it may fit snugly against the inner sloping face 99 of the rail.

To move the clamp head 87 against or from engagement with the brace rail, I provide shifting mechanism, comprising a pair of wedge blocks 90—90' which are slidably contained in the channel 91 of the channel bar member 88, the wedge blocks being keyed in a channel 94—94' in the rear face of the head 87; the channels sloping from the center of the head forwardly toward the ends so that as the blocks are moved outwardly the head is moved rearwardly toward the brace rail.

Threaded through the blocks 90—90' are screw shafts 95—95', which are revolubly anchored in a bearing block 96 fixed centrally within the channel member 88 and are revolubly extended through the opposite walls of the carriage where they are provided with operating wheels 97—97', whereby the shafts may be revolved to move the wedge blocks along the forwardly sloping faces of the head 87 to move the head to or from functional position against the brace rail 69.

To facilitate movement of the carriage along the brace rail 69 when the rear end of the carriage is supported thereon, I provide rollers 100 (Fig. XV) which are carried in an arcuate channel member 101 mounted transversely on the carriage, so that the rollers may travel on the flat upper face 102 of the rail 69 and will support the carriage thereon.

While the foundation just described may be placed at any point along the track over which the carriage may be conducted, it may be desirable to locate foundations at strategic points to facilitate rapid placement of the carriage and afford a firm support therefor. Such a foundation 110 (Figs. XVIII—XIX—XX) may be constructed of concrete and may either be provided with cut out portions to receive the pivot track section 33, as shown in Fig. XVIII, or may comprise an inset circular track 112 (Fig. XIX) corresponding to the track 34 on the semi-permanent foundation. In some cases, as shown in Fig. XX, no pivot track section is used.

With the permanent foundation the abutment rail 113 may be made continuous and as a permanent part of the concrete. In Fig. XXI, I have shown an arrangement of the brace rail for use when the gun is to be fired practically in alinement with the track. With this arrangement it is not necessary to employ as many braces as when the gun is turned transversely to the track.

In using the apparatus, assuming the parts to be constructed and assembled as described, the gun and its carriage, including the suspended foundation, may be mounted on the railway trucks and conducted along the track to a point of use. When such point is reached, the jack standards are lowered until their base ends rest on the track rails. Further operation of the jacks then lifts the gun and its carriage from the trucks and the trucks are removed (Fig. VI). When the trucks are removed the jacks are operated in reverse direction to lower the carriage and platform onto the track, so that the carriage is supported on the annular track 34 and may be turned laterally for the horizontal range, the length of the beams 50 affording an extended bearing along the track and provide such substantial bearing for the carriage that any strain due to the weight of the carriage and recoil thrust is absorbed by a substantial length of the track; particularly when the beams are of the channel form and bear on the track rails.

When the gun is no longer required at any point for use it may be again jacked up, the trucks replaced, and the gun and its carriage conducted to another point of use.

When a substantial horizontal range is required, the mode of operation is somewhat different, in that after the semi-permanent foundation 33 has been lowered onto the track the radial brace rails 65 are placed and the abutment located on and attached to the brace rails. When the parts are set, the carriage is turned to the desired angle and the clamp head 87 forced against the abutment to lock the carriage in set position.

Should the gun be required at a point where a permanent foundation like that shown in Fig. XIX is provided, the mode of operation is still different, in that after the carrying trucks have been removed the carriage is lowered to locate the semi-permanent foundation 33 on the track, the foundation released from the carriage by operation of the hook mechanism, the carriage raised by the jacks to free the foundation, the foundation removed, and the carriage again lowered to locate the roller bearings of the carriage onto the annular track in the permanent foundation. The operation just described is reversed to relocate the carriage on the carrying trucks when the gun and carriage are to be conducted to another point.

If so desired, the semi-permanent foundation, comprising the channels 61, radial rails 60 and circular base rails 69, may be set several days in advance, and the channels may be set in concrete (80′ Fig. III) to increase the stability of the foundation.

It is apparent that with the apparatus herein described, an extended line of coast or border may be defended with a minimum investment in equipment, as a gun may be carried over a railway track paralleling the coast or border line to a point of use and the position shifted as may be required, the placement of the gun on the permanent or temporary foundation being effected rapidly after the gun has reached the point of use.

While I have shown a definite extent and arrangement of the brace rails and abutment, as well as a definite combination of the semi-permanent foundation with the track, such should not be considered a limitation of the invention but merely illustrative.

Having thus described my invention, what I claim as new therein and desire to secure by Letters-Patent, is:

1. In combination with a gun carriage, a portable platform comprising an elongated base, having lateral abutment shoulders and an upper bearing part, a bearing part on the carriage coöperative with that on the platform, and brace members engaging the lateral abutments and radiating from the platform when the latter is in functional position.

2. In combination with a gun carriage, a portable platform comprising an elongated base, a circular rail, and abutment shoulders on the base facing outwardly and laterally at opposite sides of the rail, brace members engaging said abutments, and means on the gun carriage supporting the same from the circular rail.

3. In combination with a gun carriage, a portable platform comprising an elongated base and a circular rail on the base, abutment shoulders on both longitudinal edges of the base, facing outwardly and at an angle to the base at opposite sides of the rail, a bearing part on the carriage coöperative with the rail to rotatably support the carriage, and braces abutting said shoulders.

4. In combination with a railway track, a platform at the side of the track comprising a brace member, a gun carriage supported from the track, a clamp block on the carriage movable to engagement with the said brace member, wedge blocks carried by the carriage and engageable with the clamp block and screw mechanism anchored to the carriage and operable on the wedge blocks to actuate the clamp block.

5. In combination with a gun carriage and a railway track, a platform at the side of the track comprising a brace rail, a clamp block slidable on the carriage and adapted for engaging the brace rail, blocks slidable on the carriage and having wedge relation with the clamp block and screw mechanism anchored to the carriage and operative on the wedge blocks to actuate the clamp block.

6. In combination with a gun carriage and a railway track, a platform at the side of the track comprising a brace rail, having a lateral clamp face and horizontal track face, means on the carriage for supporting engagement with track face of the brace rail, a brace beam on the carriage and a clamp block on the brace beam for engaging the clamp face on the brace rail.

7. In combination with a platform comprising a circular rail and beams supporting the rail and provided with outwardly facing shoulders, rails radiating from the circular rail and some having abutment against said shoulders, and means supported by said radiating rails providing an auxiliary support and brace for a carriage rotatably mounted on the circular rail.

8. In combination with a platform comprising a circular rail, a plurality of spaced ground beams concentric with the circular rail, rails supported on said ground beams and arranged radially relative to the circular rail and a brace rail supported on said radial rails.

9. In combination with a platform, comprising a down-set, circular flange and a circular rail supported on the platform and flange, radial rails having sockets at their inner ends receiving said flange to anchor the rails, a track supported on said radial rails having a surface providing an auxiliary support and a face providing a brace for a carriage supported on said circular rail, a gun carriage supported on said circular rail and supplementally supported on and braced from said track.

10. In combination with a platform comprising a circular rail, spaced beams arranged concentrically with the circular rail and comprising upwardly opening channels, radial rails supported on said beams, and anchor blocks in said channels engaging the radial rails.

In testimony whereof I affix my signature.

DANIEL G. SAUNDERS, Jr.